US009554357B2

(12) United States Patent
Lee et al.

(10) Patent No.: US 9,554,357 B2
(45) Date of Patent: *Jan. 24, 2017

(54) METHOD OF PROVIDING A SERVICE ON A DOWNLINK SHARED CHANNEL

(71) Applicant: LG ELECTRONICS INC., Seoul (KR)

(72) Inventors: Young Dae Lee, Gyeonggi-do (KR); Sung Duck Chun, Gyeonggi-do (KR); Myung Cheul Jung, Seoul (KR); Sung Jun Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 150 days.

This patent is subject to a terminal disclaimer.

(21) Appl. No.: 14/478,796

(22) Filed: Sep. 5, 2014

(65) Prior Publication Data
US 2014/0376445 A1 Dec. 25, 2014

Related U.S. Application Data

(63) Continuation of application No. 12/064,319, filed as application No. PCT/KR2006/003024 on Aug. 1, 2006, now Pat. No. 8,861,417.

(30) Foreign Application Priority Data

Aug. 25, 2005 (KR) ........................ 10-2005-0078366

(51) Int. Cl.
*H04W 74/04* (2009.01)
*H04L 12/18* (2006.01)
(Continued)

(52) U.S. Cl.
CPC .......... *H04W 72/005* (2013.01); *H04L 12/189* (2013.01); *H04W 4/06* (2013.01);
(Continued)

(58) Field of Classification Search
CPC ...... H04W 72/14; H04W 72/005; H04W 4/06; H04W 74/04; H04W 4/12; H04W 36/18; H04L 12/189
See application file for complete search history.

(56) References Cited

U.S. PATENT DOCUMENTS 7,142,527 B2 11/2006 Garcia-Luna-Aceves
7,352,698 B2 4/2008 Niwano et al.
(Continued)

FOREIGN PATENT DOCUMENTS

CN 1396744 2/2003
CN 1423435 6/2003
(Continued)

OTHER PUBLICATIONS

Samsung, "MBMS Combining & Scheduling", 3GPP TSG RAN2 #44, R2-041958, Oct. 2004.
(Continued)

*Primary Examiner* — Brian D Nguyen
(74) *Attorney, Agent, or Firm* — Birch, Stewart, Kolasch & Birch, LLP

(57) ABSTRACT

A method of receiving a service from a network in a mobile communication system in accordance with the present invention comprises receiving static scheduling information from a network, the static scheduling information including information on radio resources associated with combining reception, receiving dynamic scheduling information from the network, the dynamic scheduling information including control information for receiving the service, and receiving the service by combining downlink shared channels transmitted from a plurality of cells based on the static scheduling information and the dynamic scheduling information.

3 Claims, 10 Drawing Sheets

(51) Int. Cl.
*H04W 72/00* (2009.01)
*H04W 72/14* (2009.01)
*H04W 4/06* (2009.01)
*H04W 4/12* (2009.01)
*H04W 36/18* (2009.01)

(52) U.S. Cl.
CPC ........... *H04W 72/14* (2013.01); *H04W 74/04* (2013.01); *H04W 4/12* (2013.01); *H04W 36/18* (2013.01)

(56) References Cited

U.S. PATENT DOCUMENTS

| | | |
|---|---|---|
| 7,436,811 B2 | 10/2008 | Putcha et al. |
| 7,471,645 B2 | 12/2008 | Torres et al. |
| 7,606,205 B2 | 10/2009 | Ranta-Aho et al. |
| 7,616,611 B2 | 11/2009 | Hwang et al. |
| 7,706,318 B2 | 4/2010 | Lee et al. |
| 7,821,983 B2 | 10/2010 | Wang et al. |
| 7,826,415 B2 | 11/2010 | Oh et al. |
| 7,869,399 B2 | 1/2011 | Terry |
| 2003/0189909 A1* | 10/2003 | Chao ................ H04L 1/1854 370/331 |
| 2003/0220119 A1 | 11/2003 | Terry |
| 2004/0008646 A1 | 1/2004 | Park et al. |
| 2004/0081125 A1 | 4/2004 | Ranta-Aho et al. |
| 2004/0105402 A1 | 6/2004 | Yi et al. |
| 2004/0162818 A1 | 8/2004 | Shaw |
| 2004/0168818 A1 | 9/2004 | Layden et al. |
| 2004/0229624 A1 | 11/2004 | Cai et al. |
| 2005/0037768 A1 | 2/2005 | Hwang et al. |
| 2005/0122950 A1* | 6/2005 | Ikeda ................ H04W 72/1289 370/345 |
| 2005/0141475 A1* | 6/2005 | Vijayan ................ H04W 4/06 370/345 |
| 2005/0147127 A1 | 7/2005 | Putcha et al. |
| 2005/0171984 A1 | 8/2005 | Wang et al. |
| 2006/0013225 A1* | 1/2006 | Haywood ........... H04L 12/4641 370/389 |
| 2006/0030342 A1 | 2/2006 | Hwang et al. |
| 2006/0161951 A1* | 7/2006 | Hindle ................ H04N 21/235 725/46 |
| 2006/0176966 A1* | 8/2006 | Stewart ............... H04L 27/2607 375/260 |

FOREIGN PATENT DOCUMENTS

| | | |
|---|---|---|
| EP | 1465444 | 10/2004 |
| JP | 2003-023381 | 1/2003 |
| JP | 2003-124941 | 4/2003 |
| JP | 2004-166209 | 6/2004 |
| JP | 2006528455 | 12/2006 |
| RU | 2172564 | 8/2001 |
| TW | I225737 B | 12/2004 |
| WO | 2004/002021 | 12/2003 |
| WO | 2004017540 | 2/2004 |
| WO | 2004017541 | 2/2004 |
| WO | 2005/011157 | 2/2005 |
| WO | 2005018154 | 2/2005 |

OTHER PUBLICATIONS

Taiwan Intellectual Property Office Application Serial No. 095128190, Office Action dated Aug. 5, 2013, 5 pages.

* cited by examiner

FIG. 5

| Frame Number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| SSFN | | | | 1 | | | | 2 | | | | 3 | | | | 4 | | | | 5 | | | | 6 |
| Service Number | S#5 | S#3 | S#6 | S#2 | | S#5 | S#4 | S#1 | S#5 | S#6 | S#3 | | S#5 | S#5 | S#3 | S#2 | S#6 | S#5 | S#7 | S#1 | S#4 | S#5 | | S#3 |

METHOD OF PROVIDING A SERVICE ON A DOWNLINK SHARED CHANNEL

CROSS REFERENCE TO RELATED APPLICATIONS

This application is a continuation of U.S. patent application Ser. No. 12/064,319, filed on Aug. 18, 2008 (now U.S. Pat. No. 8,861,417 issued on Oct. 14, 2014), which is the National Stage filing under 35 U.S.C. 371 of International Application No. PCT/KR2006/003024, filed on Aug. 1, 2006, which claims the benefit of earlier filing date and right of priority to Korean Application No. 10-2005-0078366, filed on Aug. 25, 2005, the contents of which are hereby incorporated by reference herein in their entirety.

TECHNICAL FIELD

The present invention relates to a wireless communication system, more particularly to a method of providing and receiving a service on a downlink shared channel in a wireless communication system.

BACKGROUND ART

FIG. 1 is a block diagram of a network structure of a universal mobile telecommunications system (UMTS) of a 3GPP asynchronous IMT-2000 system. Referring to FIG. 1, a UMTS mainly includes a user equipment (UE), a UMTS terrestrial radio access network (UTRAN) and a core network (CN). The UTRAN includes at least one radio network sub-system (hereinafter abbreviated RNS). The RNS includes one radio network controller (RNC) and at least one base station (Node B) managed by the RNC. At least one or more cells exist in one Node B.

FIG. 2 is an architectural diagram of a radio interface protocol between the UE (user equipment) and the UTRAN (UMTS terrestrial radio access network). Referring to FIG. 2, a radio interface protocol vertically includes a physical layer, a data link layer, and a network layer. Horizontally, the radio interface protocol includes a user plane for data information transfer and a control plane for signaling transfer. The protocol layers in FIG. 2 can be divided into a first layer (L1), a second layer (L2), and a third layer (L3) such as the three lower layers of an open system interconnection (OSI) standard model widely known in the art. The respective layers in FIG. 2 are explained as follows.

A physical layer (PHY) is the first layer and offers an information transfer service to an upper layer using a physical channel. The physical layer (PHY) is connected to a medium access control (MAC) layer located above the physical layer PHI via a transport channel. Data is transferred between the MAC layer and the PHY layer via the transport channel. Moreover, data is transferred between different physical layers, and more particularly, between a physical layer of a transmitting side and a physical layer of a receiving side via the physical channel.

The MAC layer of the second layer offers a service to a radio link control (RLC) layer located above the MAC layer via a logical channel. The RLC layer supports reliable data transfer and is operative in segmentation and concatenation of RLC service data units sent down from an upper layer. Hereinafter, the service data unit will be abbreviated SDU.

A broadcast/multicast control (BMC) layer schedules a cell broadcast message (CB message) delivered from a core network and facilitates broadcasting the message to UEs existing in a specific cell (s). From a UTRAN perspective, the CB message is delivered from a higher layer and is additionally provided with information such as a message ID, a serial number, and a coding scheme, for example. The CB message is delivered to an RLC layer in a BMC message format, and is then delivered to a MAC layer via a logical channel, such as a common traffic channel (CTCH). The logical channel CTCH is mapped to a transport channel, such as a forward access channel (FACH) and a physical channel, such as a secondary common control physical channel (S-CCPCH).

A packet data convergence protocol (PDCP) layer lies above the RLC layer and enables data, which is transferred via a network protocol such as an IPv4 or IPv6, to be efficiently transferred on a radio interface having a relatively small bandwidth. For this, the PDCP layer facilitates reducing unnecessary control information used by a wired network. This function is called header compression, for which a header compression scheme such as RFC2507 or RFC3095 (robust header compression: ROHC), defined by the Internet Engineering Task Force (IETF), can be used. In these schemes, only information mandatory for a header part of data is transferred, thereby reducing data volume to be transferred by transferring a smaller amount of control information.

A radio resource control (RRC) layer is located on a lowest part of the third layer. The RRC layer is defined in the control plane only and is associated with the configuration, reconfiguration and release of radio bearers (RBs) for controlling the logical, transport and physical channels. In this case, the RB is a service offered to the second layer for a data transfer between the OE and the UTRAN. Specifically, the RB is a logical path provided by Layer 1 and Layer 2 of a radio protocol for the data delivery between the UE and the UTRAN The configuration of the RB is a process of regulating characteristics of protocol layers and channels necessary for offering a specific service and a process of setting their specific parameters and operational methods, respectively.

The RRC layer broadcasts system information via a broadcast control channel (BCCH). System information for one cell is broadcast to the UE via a system information block (SIB) format. In case that the system information is changed, the UTRAN transmits BCCH modification information to the UE via a paging channel (PCH) or a forward access channel (EACH) to induce the UE to receive the latest system information.

A multimedia broadcast/multicast service (MBMS) is described below. An MBMS provides a streaming or background service to a plurality of UEs using a downlink dedicated MBMS bearer service. An MBMS includes at least one session. MBMS data is transmitted to a plurality of the UEs via the MBMS bearer service during an ongoing session. The UTRAN provides the MBMS bearer service to UE using a radio bearer (RB). A point-to-point radio bearer is a bi-directional radio bearer and includes a logical channel DTCH (dedicated traffic channel), a transport channel DCH (dedicated channel), and a physical channel DPCH (dedicated physical channel) or a physical channel SCCPCH (secondary common control physical channel). A point-to-multipoint radio bearer is a unidirectional downlink. The point-to-multipoint radio bearer includes a logical channel MTCH (MBMS traffic channel), a transport channel FACH (forward access channel), and a physical channel SCPCH. The logical channel MTCH is configured for each MBMS offered to a cell and is used to transmit user-plane data related to a specific MBMS to a plurality of UEs.

FIG. 3 is a diagram illustrating an example of channel mapping for reception of a point-to-multipoint service by a terminal.

Referring to FIG. 3, a logical channel MCCH (MBMS control channel) is a point-to-multipoint downlink channel and is used in transmitting control information associated with the MBMS. The logical channel MCCH is mapped to the transport channel FACH (forward access channel), while the transport channel FACH is mapped to the physical channel SCCPCH (secondary common control physical channel). At least one MCCH exists within a cell.

The UTRAN that offers the MBMS transmits MCCH information to a plurality of UEs via the MCCH channel. The MCCH information includes a notification message associated with the MBMS (e.g., RRC message associated with the MBMS). For instance, the MCCH information may include a message providing notification of MBMS information, a message providing notification of point-to-multipoint radio bearer information, and/or access information providing notification of an EEC connection being requested for a specific MBMS.

FIG. 4 is a diagram illustrating a protocol stack structure of HS-DSCH in accordance with the related art. HS-DSCH comprises a transmission time interval (hereinafter referred to as "TTI") of 2 ms length having three slots. A HARQ (Hybrid Automatic Repeat request) scheme is used for HS-DSCH. An AMC (Adaptive Modulation and Coding) scheme is also used for HS-DSCH, whereby the most appropriate combination of a modulation and coding method is selected for the current channel circumstances to achieve optimal throughput.

Referring to FIG. 4, a data unit transferred from an RLC layer of a SRNC is transferred to a MAC-d entity managing transport channels through a logical channel DTCH or DCCH and then is transferred to a MAC-HS entity of a Node B via a MAC-c/sh/m entity of a CRNC. MAC-d, MAC-c/sh/m, and MAC-hs are MAC entities managing transport channels, common channels, and HS-DSCH, respectively.

A physical channel HS-PDSCH is used for delivering a transport channel HS-DSCH. A spreading factor for HS-PDSCH is fixed to 16 and a channelization code is selected for HS-PDSCH among a channelization code set reserved for data transmission on HS-DSCH. When a multi-code transmission is enabled, a plurality of channelization codes are allocated during a sub-frame of HS-PDSCH.

Control information for HS-DSCH is necessary to be transmitted for transmitting user data on HS-DSCH. The control information is exchanged through downlink HS-SCCH (High Speed Shared Control Channel) and uplink HS-DPCCH (High Speed Dedicated Physical Control Channel). HS-SCCH is a downlink physical channel using 16 as a spreading factor and having a data rate of 60 kbps. Information transmitted on HS-SCCH comprises TFRI (Transport Format and Resource related Information), HARQ related information, and an UE identity (H-RNTI) masked to be transmitted for identifying a user to receive the user data. HS-DPCCH is an uplink physical channel through which a UE transmits CQIs (Channel Quality Indicators) for periodically reporting channel status to a Node B and ACK/NACK information for supporting HARQ.

Different scheduling schemes are used during transmitting user data for a service through a downlink shared channel in different cells in the related art. Accordingly, since a UE is unable to receive identical user data through a downlink shared channel from two or more cells at the same time, a diversity gain achieved by combining reception cannot be obtained. Under the foregoing circumstances, when an UE is located at a cell boundary, reception sensitivity for the UE can be deteriorated.

DISCLOSURE OF INVENTION

Accordingly, the present invention is directed to a method of providing a service on a downlink shared channel that substantially obviates one or more problems due to limitations and disadvantages of the related art.

An object of the present invention is to provide a method of providing and receiving a service on a downlink shared channel or a downlink common channel, whereby a user equipment (UE) is able to receive the service by combining data through the downlink shared channel or downlink common channel from a plurality of cells.

An another object of the present invention is to provide a method of providing and receiving a service on a downlink shared channel or a downlink common channel, whereby reception sensitivity in a UE receiving a service through the downlink shared channel or downlink common channel can be raised.

Additional advantages, objects, and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method of receiving a service from a network in a mobile communication system comprises receiving static scheduling information from a network, the static scheduling information including information on radio resources associated with combining reception, receiving dynamic scheduling information from the network, the dynamic scheduling information including control information for receiving the service, and receiving the service by combining downlink shared channels transmitted from a plurality of cells based on the static scheduling information and the dynamic scheduling information.

In accordance with another embodiment of the present invention, a method of receiving a service on a point-to-multipoint channel in a mobile communication system comprises receiving outer scheduling information on a first channel, wherein the outer scheduling information provides information on which radio resource is combinable, receiving inner scheduling information on a second channel, wherein the inner scheduling information provides information on when the service is transmitted with the radio resource, and receiving the service by combining point-to-multipoint channels transmitted from a plurality of cells using the radio resource based on the outer scheduling information and the inner scheduling information.

In accordance with another embodiment of the present invention, a method of providing a service to at least one user equipment (UE) in a mobile communication system comprises transmitting static scheduling information to the at least one UE, the static scheduling information including information on radio resources associated with combining reception, transmitting dynamic scheduling information to the at least one UE, the dynamic scheduling information including control information for receiving the service, and transmitting data for the service through a plurality of base station to the at least one UE with the radio resources.

In accordance with another embodiment of the present invention, a method of receiving a service from a network in a mobile communication system comprises receiving information on radio resources allocated for the service which is simultaneously transmitted from a plurality of base station, receiving control information for receiving the service, and receiving the service by combining downlink shared channels transmitted from the plurality of cells based on the information on radio resources and the control information.

A specific time duration, a specific frequency, a specific code, or a specific time-frequency region is allocated for a specific service transmitted through a downlink shared channel by a cell. A UE receives control information for the downlink shared channel through a second cell of the cell. The UE receives and combines user data from a plurality of cells using the allocated specific time duration, specific frequency, specific code, or the specific time frequency region in accordance with the control information.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute apart of this specification, illustrate embodiments of the invention and together with the description serve to explain the principles of the invention. Features, elements, and aspects of the invention that are referenced by the same numerals indifferent figures represent the same, equivalent, or similar features, elements, or aspects in accordance with one or more embodiments.

FIG. 5 is a diagram for describing a process of static scheduling and dynamic scheduling in accordance with the preferred embodiment of the present invention.

BEST MODE FOR CARRYING OUT THE INVENTION

Figure 1:
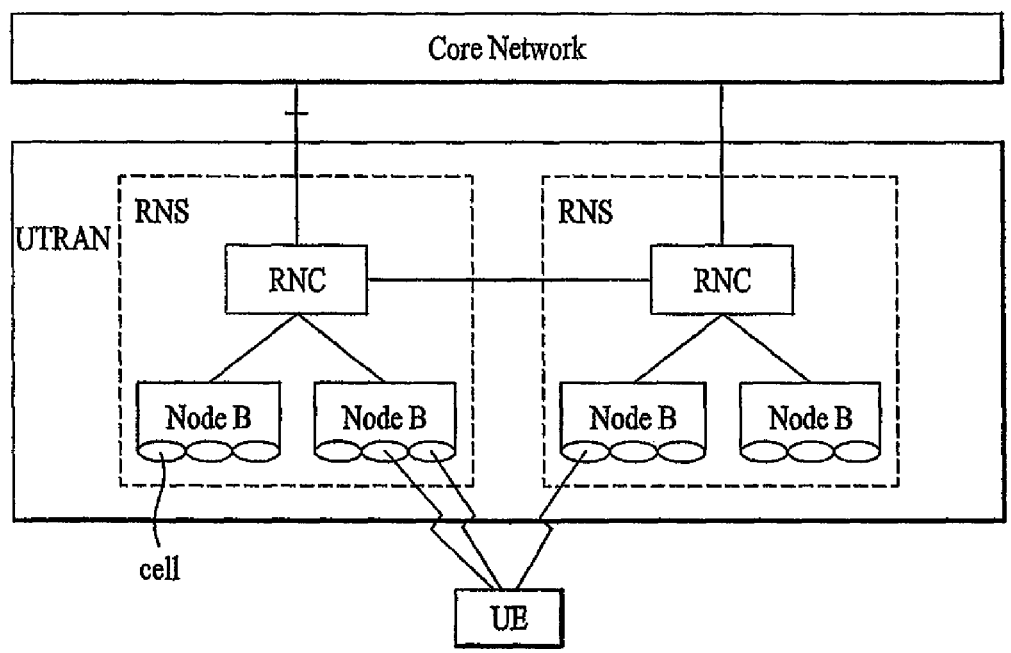
FIG. 1 is a block diagram of a network structure of a universal mobile telecommunications system (UMTS).
Figure 2:
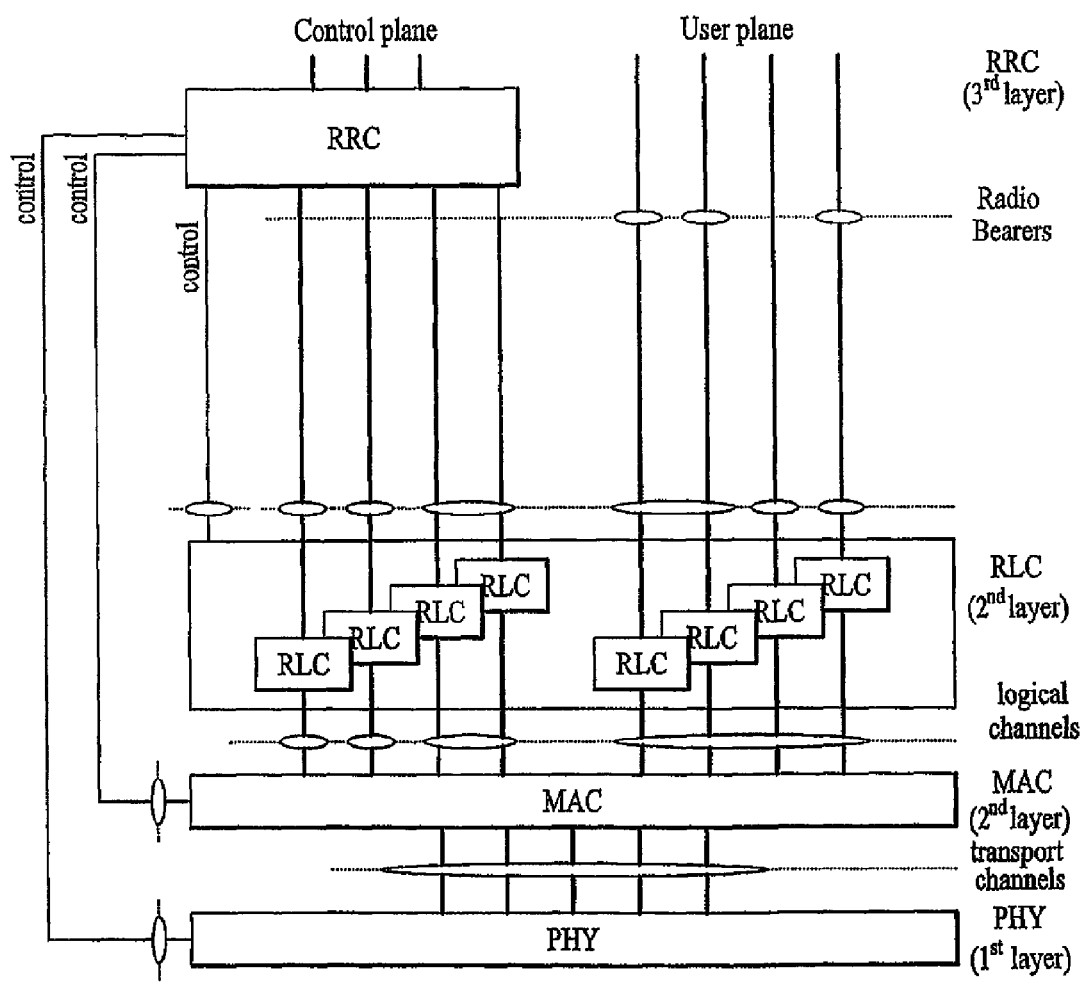
FIG. 2 is an architectural diagram of a radio interface protocol between a UE and a UTRAN used by the UMTS.
Figure 3:
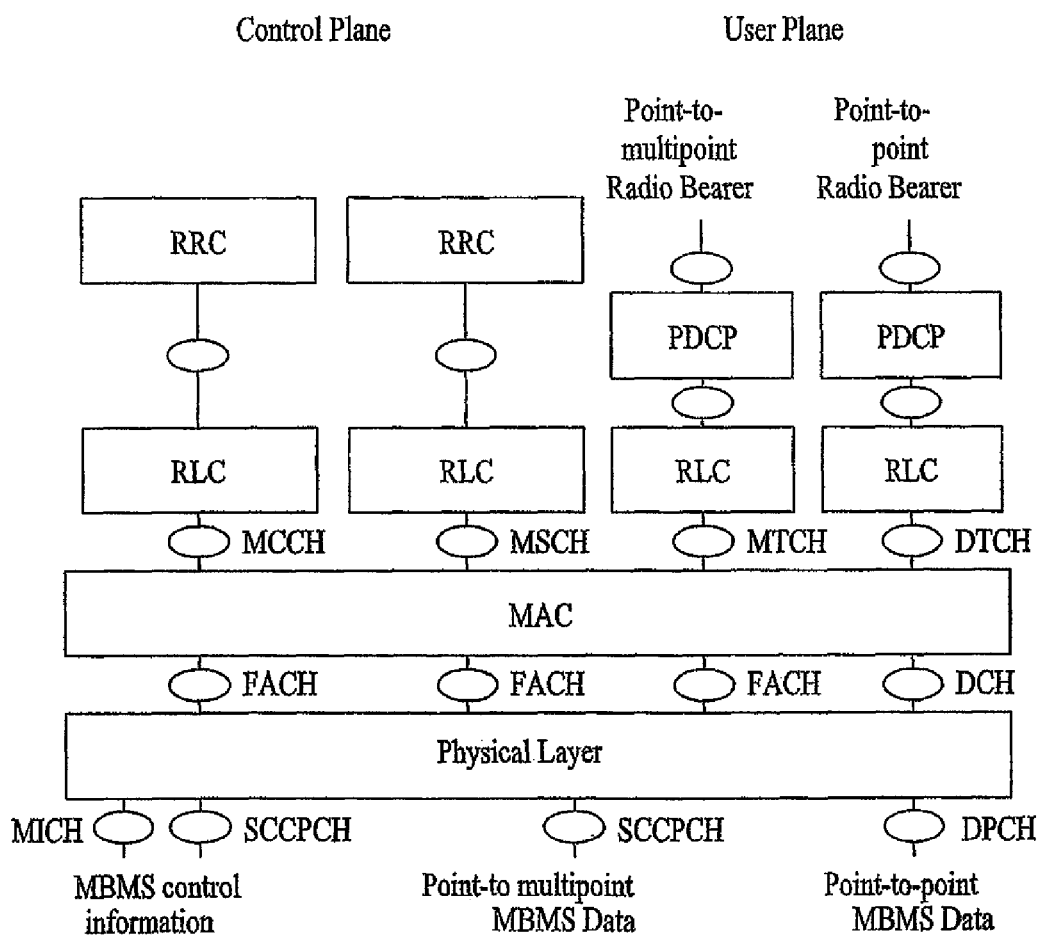
FIG. 3 is a diagram illustrating a channel structure in a UE for an MEMS service in accordance with the related art.
Figure 4:
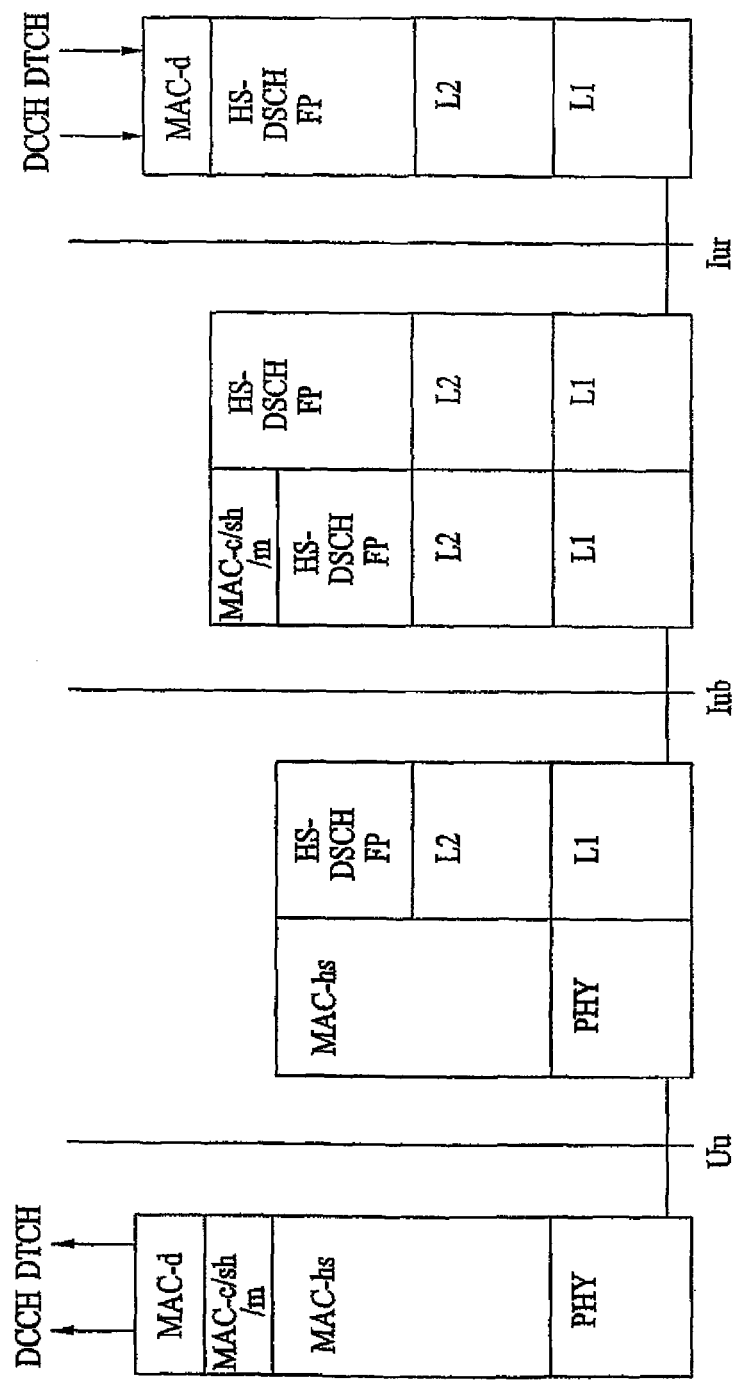
FIG. 4 is a diagram illustrating a protocol stack structure of HS-DSCH in accordance with the related art.

Reference will now be made in detail to the preferred embodiments of the present invention, examples of which are illustrated in the accompanying drawings. Wherever possible, the same reference numbers will be used throughout the drawings to refer to the same or like parts.

FIG. 5 is a diagram for describing a process of static scheduling and dynamic scheduling in accordance with the preferred embodiment of the present invention. A process of data transmission for a service through a downlink shared channel will be described in detail with reference to FIG. 5 on a temporal axis in accordance with a preferred embodiment of the present invention. In FIG. 5, the first row represents frame numbers of the downlink shared channel, the second row static scheduling frame number (SSFN) for static scheduling, and the third row services allocated to each frame.

A frame is time duration of a minimum length to be allocated to data transmission of a service. Namely, radio resources such as time, code, or frequency, etc. are allocated by unit of a frame in the downlink shared channel. A static scheduler in accordance with a preferred embodiment of the present invention designates at least one frame for the static scheduling and allocates a SSFN to each of the at least one frame. In an example of FIG. 5, the static scheduler has designated six frames having the frame No. of 4, 8, 12, 16, 20, and 24 for the static scheduling and allocated SSFNs to them.

A dynamic scheduler allocates a service to each frame and thereby data for a service is transmitted through an allocated frame. In the example of FIG. 5, the static scheduling is applied to S#1 and S#2 simultaneously transmitted to a plurality of cells and the dynamic scheduling is applied to the other services. A data distributor allocates data PDUs for S#1 and S#2 to frames having the number of 4, 8, 16, and 20 in consideration of the static scheduling. The distributor may attach a SSFN to each service PDU for S#1 and S#2 and a dynamic scheduler node related to S#1 and S#2 may transmit a service PDU to a UE through a corresponding frame of the downlink shared channel by referring to a SSFN attached to the service PDU. Meanwhile, the dynamic scheduler is able to allocate the frames 12 and 24 not allocated to services to which the static scheduling is applied to other services. In FIG. 5, the frame #24 is allocated to S#3 to which the static scheduling is not applied. The dynamic scheduler allocates data for the services other than S#1 and S#2 to other frames to which the static scheduling is not applied.

The dynamic scheduler transmits control information through a downlink control channel for informing UEs of a service allocated to a frame. The control information includes an identifier of a service allocated to a corresponding frame and an identifier of a UE or a UE group to receive the service. In the HSDPA system, the downlink control channel is HS-SCCH, and the frame corresponds to a sub-frame of HS-SCCH or HS-PDSCH.

A UE receive the downlink control channel periodically to obtain control information in each frame. The UE receives the service by combining data for the service from a plurality of cells according to instructions of the control information. Namely, the UE receives the service during time duration (frames) instructed by the control information by combining data for the service from the plurality of cells. A combining reception scheme can be enabled to all frames, to which the static scheduling is applied. Meanwhile, the UTRAN may designates frames with which the combining reception scheme can be enabled and another frames with which the combining reception scheme cannot be enabled. In this case, the UTRAN informs UEs whether the combining reception is enabled in a frame. The UTRAN may inform UEs through the downlink control channel whether the UEs can use the combining reception scheme in every frame to which the static scheduling is applied.

Figure 6:
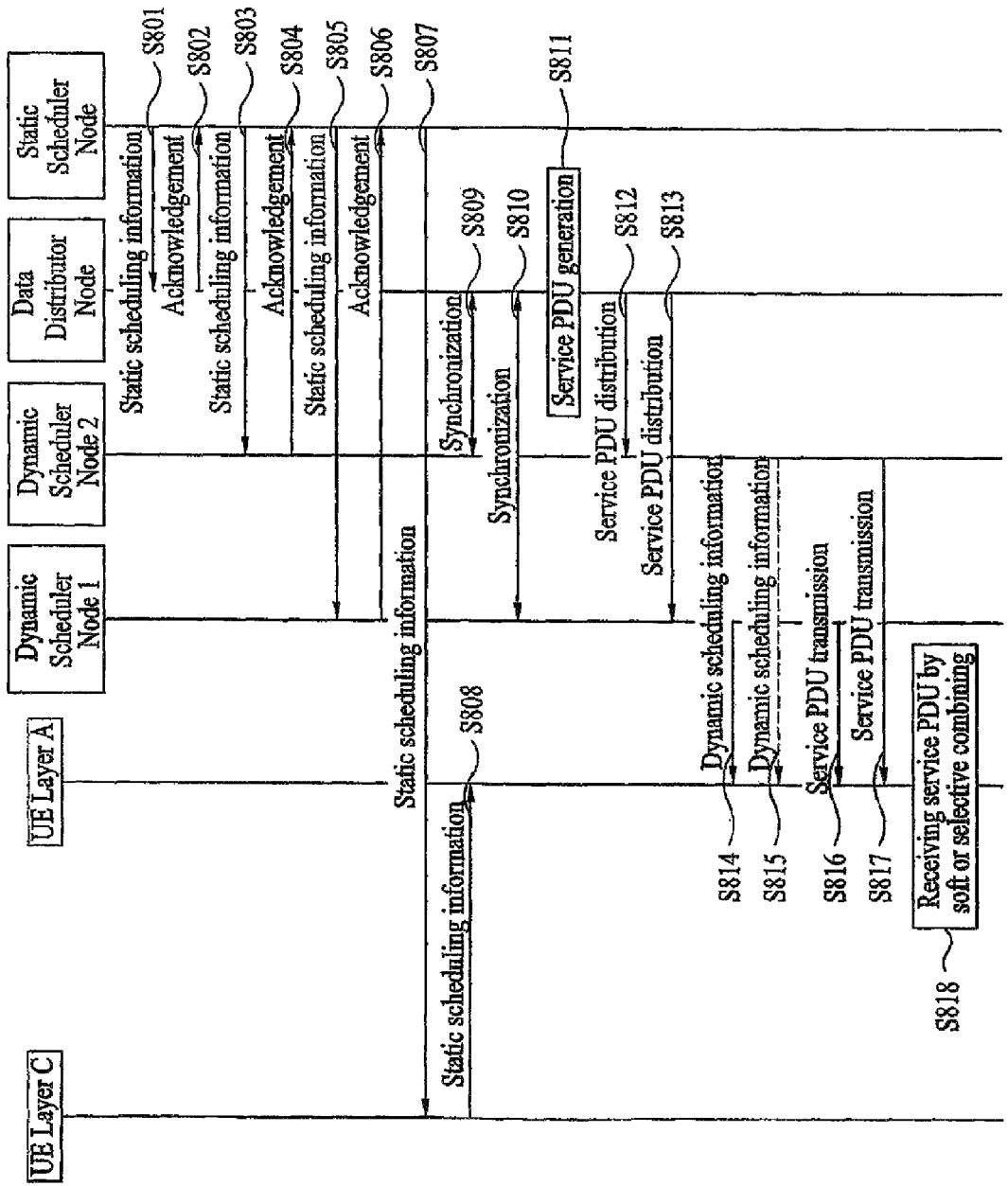
FIG. 6 is a flow diagram illustrating a preferred embodiment of the present invention.

FIG. 6 is a flow diagram illustrating a preferred embodiment of the present invention. Referring to FIG. 6, a UE has a Layer A of a lower layer and a Layer C of a higher layer. For example, the Layer C performs an identical function with an RRC layer and the Layer A may perform functions of a physical layer, a MAC layer, and an RLC layer. A dynamic scheduler node is a network node performing dynamic scheduling. For example, a Node B including a dynamic scheduler can be the dynamic scheduler node. A data distributor node is a network node performing data distribution. For example, a serving Node-B (S-NB) or a user plane (UP) node having a static scheduler can be the data distributor node. A static scheduler node is a network node performing static scheduling. For example, a control plane (CP) node having a static scheduler can be the static scheduler node. Meanwhile, the static scheduler may also be located in the S-NB. A dynamic scheduler node 1 and a dynamic scheduler node 2 in FIG. 6 correspond to two different Node Bs from which a UE receives downlink channels and one of them corresponds to a serving Node-B from which the UE receives downlink control information through a downlink control channel. In FIG. 6, the dynamic scheduler node 1 is supposed to be the serving Node-B.

The location of the network nodes described above is exemplary and can be diversified in accordance with network structure. Some examples are detailed in below with reference to FIG. 7 and FIG. 8.

Figure 7:
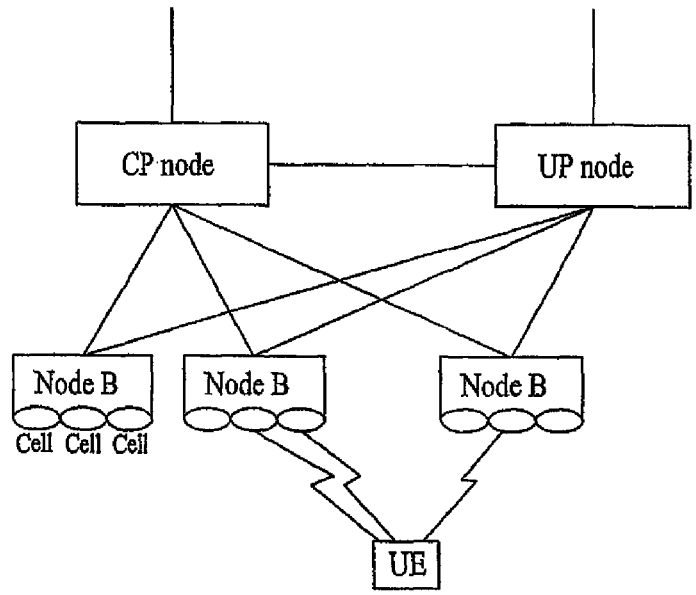
FIG. 7 is a diagram illustrating a network structure in accordance with a preferred embodiment of the present invention.

FIG. 7 is a diagram illustrating a network structure in accordance with a preferred embodiment of the present invention. Referring to FIG. 7, an RNC comprises a control plane (CP) node and a user plane (UP) node. The CP node controls Node Bs and a part of functions of UEs. The CP node has a static scheduler and whereby performs downlink scheduling for data for a multicast service or a UR-dedicated service which needs downlink diversity. The UP node performs a function of data distribution to distribute user data to Node Bs. A dynamic scheduler performing downlink scheduling for data transmitted to each cell is located within each Node B. Accordingly, each Node B performs almost scheduling of data transmission. The UP node performs the function of data distribution to transmit service data which needs the diversity to at least one cell in accordance with the control of the CP node.

Figure 8:
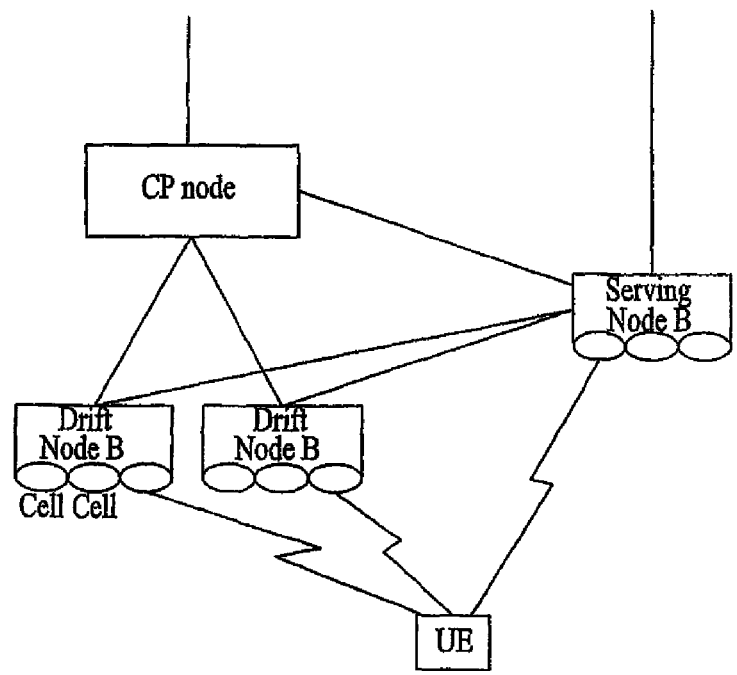
FIG. 8 is a diagram illustrating a network structure in accordance with another preferred embodiment of the present invention.

FIG. 8 is a diagram illustrating a network structure in accordance with another preferred embodiment of the present invention. In FIG. 8, the functions of the UP node in FIG. 7 are incorporated into a CP node. A Node B performing main control over a UE is called a serving Node B (S-NB) and a Node B performing supplementary control over the UE is called a drift Node B (D-NB). The D-NB transmits user data to the UE through a radio link after receiving the user data from the S-NB. Both the S-NB and D-NB have established radio links with the UE. Meanwhile, the S-NB receives user data for the UE from other network node and transmits the user data to D-NBs related with the UE and the UE. In FIG. 8, a static scheduler for data transmission scheduling of a downlink shared channel is located in the CP node and a dynamic scheduler for each cell is located in the S-NB and the D-NB. Alternatively, the S-NB can have the static, scheduler. The function of data distribution is performed by a data distributor in the S-NB node.

Referring to FIG. 6, the static scheduler node establishes static scheduling information and transfers a message including the static scheduling information to the data distributor node [S801]. The static scheduling information includes SSFN allocation information for allocating a SSFN to a frame of a downlink shred channel. The static scheduling information may include information on whether a combining reception can be enabled with regard to each frame included in the frames to which the static scheduling is applied. The static scheduling information may also include synchronization information for synchronizing the data distributor node and the dynamic scheduler node 1 and 2. The data distributor node transfers an acknowledgement message for responding to the message to the static scheduler node [S802].

The static scheduler node transfers the message including the static scheduling information to the dynamic scheduler node 1 and 2 [S803, S805]. The dynamic scheduler node 1 and 2 transfer acknowledgement messages, respectively for responding to the message to the static scheduler node [S809, S806]. The static scheduling information may include synchronization information for synchronizing the data distributor node and the dynamic scheduler node 1 and 2.

The static scheduler node transmits the static scheduling information to the UE layer C via the dynamic scheduler node 1 and 2 [S807]. The UE layer C transfers the received static scheduling information to the UE layer A [S808]. The data distributor node performs a synchronization procedure with the dynamic scheduler node 1 and 2 to exchange data at an exact time [S809, S810].

The data distributor node generates protocol data units (PDUs) for a user-dedicated service, a multicast service, or a broadcasting service to which the static scheduling is applied [S811]. The PDUs are generated using data from an upper node of the data distributor node.

The data distributor node distributes the PDUs to the dynamic scheduler node 1 and 2 related with the UE to which the PDUs are to be transmitted [S814, S815]. The data distributor node informs the dynamic scheduler node 1 and 2 of SSFNs indicating transmission time of the PDUs.

The dynamic scheduler node 1 transmits dynamic scheduling information to the UE through a frame of a downlink control channel corresponding to a frame of a downlink shared channel indicated by a received SSFN [S814]. The dynamic scheduling information includes information on a frame, a code, a frequency, or a time-frequency region with which a PDU is transmitted and an indicator of a UE or a UE group to receive the PDU. The dynamic scheduling information may include information on whether the UE is able to receive the service by combining PDUs from the dynamic scheduler node 1 and 2 using the frame, code, frequency, or the time-frequency region. The UE receives the dynamic scheduling information form the dynamic scheduler node 1 which is the serving Node B. However, the dynamic scheduler node 2 may transmit the dynamic scheduling information to the UE or other UEs [S815].

A plurality of cells covered by the dynamic scheduler node 1 and 2 transmit the PDUs at a frame indicated by the received SSFN [S816, S817]. The UE layer A receives and combines the PDUs from the plurality of cells using the static scheduling information and the dynamic scheduling information. The UE can use either a selection combining scheme or a soft combining scheme.

Figure 9:
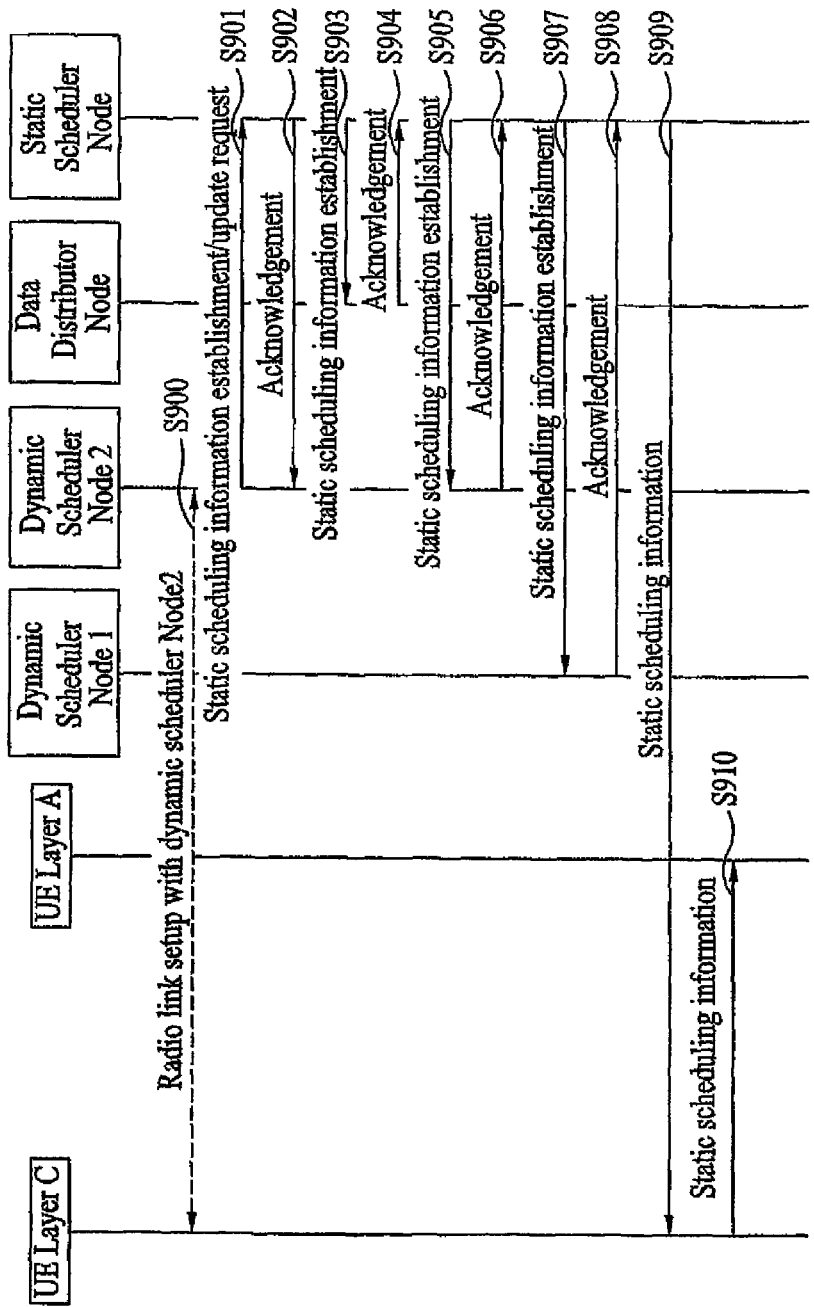
FIG. 9 is a flow diagram for describing a procedure for establishing and updating static scheduling information in accordance with a preferred embodiment of the present invention.

FIG. 9 is a flow diagram for describing a procedure for establishing and updating static scheduling information in accordance with a preferred embodiment of the present invention. In FIG. 9, it is assumed that the UE has already established a radio link with the dynamic scheduler node 1 [S900].

The dynamic scheduler node 2 may transfer a message for requesting establishment or update of static scheduling information to the static scheduler node when the UE wishes to newly establish a radio link with the dynamic scheduler node 2 while maintaining the radio link with the dynamic scheduler node 1 or when radio or wire resources are to be changed [S901]. The message may include a part or whole of the static scheduling information which the dynamic scheduler node 2 requests to be established or updated. After receiving the message, the static scheduler node transfers an acknowledgement message for responding to the message positively or negatively [S902]. The acknowledgement message may include changed part of the static scheduling information to be established or updated.

When the static scheduling information is determined to be established or updated in accordance with the steps of S901 and S902, the static scheduler node transfers a static scheduling information establishment message to a data distributor node related with the UE or a service for the UE and receives an acknowledgement message for the static scheduling information establishment message from the data distributor node [S903, S904].

The static scheduler node transfers a static scheduling information establishment message to the dynamic scheduler node 1 and the dynamic scheduler node 2 related with the UE or a service for the UE and receives an acknowledgement message for the static scheduling information establishment message from the dynamic scheduler node 1 and the dynamic scheduler node 2 [S905~S908]. The static scheduler node transmits the static scheduling information to at least one UE related with the service [S909]. A UE Layer C transfers the received static scheduling information to a UE Layer A so that the UE Layer A can receive and combine data for the service from a plurality of cells [S910].

Figure 10:
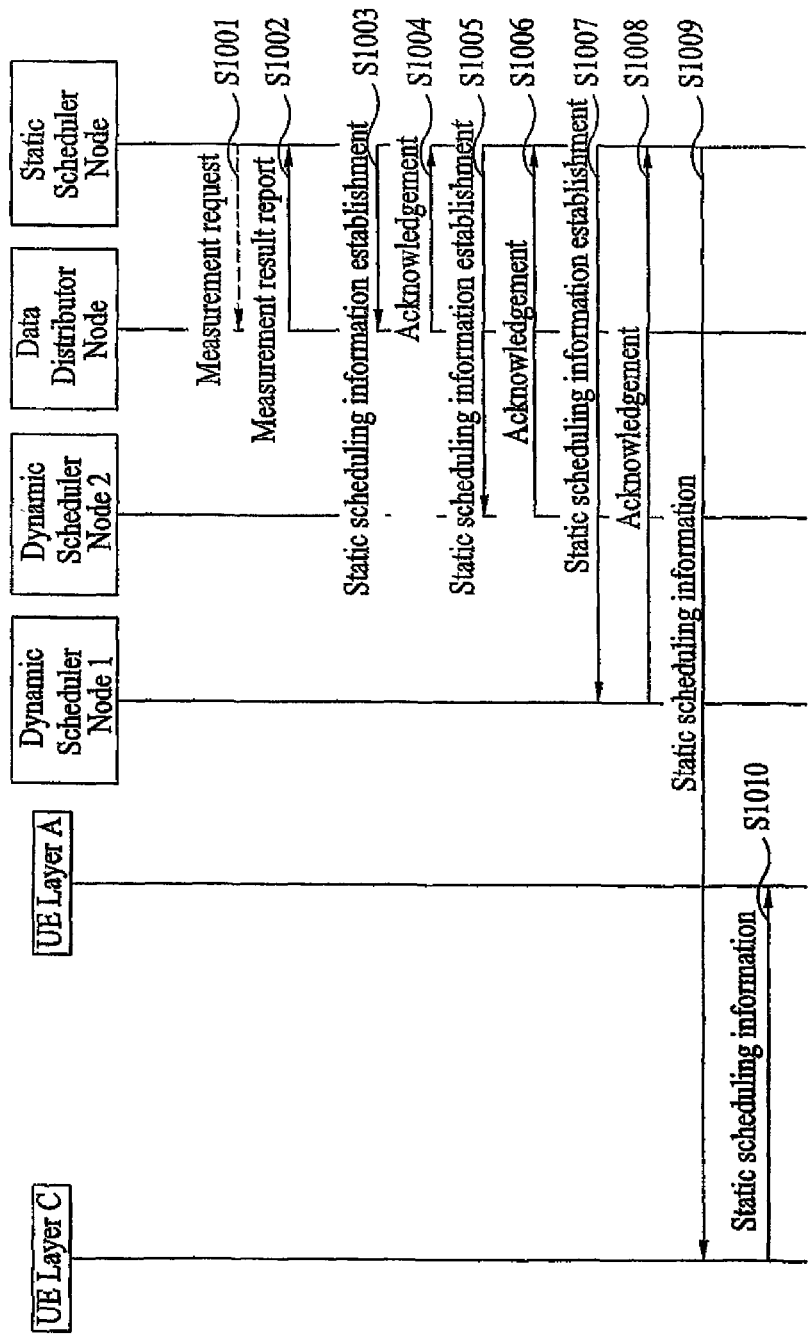
FIG. 10 is a flow diagram for describing a procedure for updating static scheduling information in accordance with a preferred embodiment of the present invention.

FIG. 10 is a flow diagram for describing a procedure for updating static scheduling information in accordance with a preferred embodiment of the present invention.

The static scheduler node may request measurement information (e.g. data amount stored in a buffer) associated with data transmission to the data distributor node [S1001]. The data distributor node reports the requested measurement information periodically or non-periodically according to the request or voluntarily to the static scheduler node [S1002].

The static scheduler node decides whether to update the static scheduling information according to the measurement information. When the static scheduling information is determined to be updated, the static scheduler node transfers a static scheduling information establishment message to the data distributor node associated with the UE or the service and receives an acknowledgement message for the static scheduling information establishment message from the data distributor node [S1003, S1004].

The static scheduler node transfers a static scheduling information establishment message to the dynamic scheduler node 1 and the dynamic scheduler node 2 related with the UE or a service for the UE and receives an acknowledgement message for the static scheduling information establishment message from the dynamic scheduler node 1 and the dynamic scheduler node 2 [S1005~S1008].

The static scheduler node transmits the static scheduling information to at least one UE related with the service [S1009]. A UE Layer C transfers the received static scheduling information to a UE Layer A so that the UE Layer A can receive and combine data for the service from a plurality of cells [S1010].

A user equipment (UE) can be called as a terminal, a mobile terminal, a mobile station, or a mobile subscriber station, etc and a Node B can be called as a base station, a base transceiver station (BTS), or a access point (AP) according to a communication system in which the UE is used. Static scheduling information can be called as outer scheduling information and dynamic scheduling information as inner scheduling information.

The present invention describes a mobile communication system and is also applicable to a wireless communication system for a PDA or notebook computer provided with a wireless communication function. Terminologies described in the present invention are not limited to a range of a wireless communication system. And, the present invention is applicable to a wireless communication system using different wireless interfaces and physical layers such as TDMA, CDMA, FDMA, etc.

Contents of the present invention can be implemented with software, firmware, hardware or combination of them. In particular, the contents of the present invention are implemented using hardware logic such as code, circuit chip and ASIC in hardware or by codes in a computer-readable storage medium such as a hard disc, a floppy disc and a tape, an optical storage, a ROM and a RAM using a computer programming language.

Codes stored in the computer-readable medium are accessible and executable by a processor. The codes implementing the contents of the present invention are accessible via a transmission medium or a file server on network. In this case, a code-implementing device includes a wire transmission medium such as a network transmission line, a wireless transmission medium, signaling, wireless signaling, IR signaling and the like.

Figure 11:
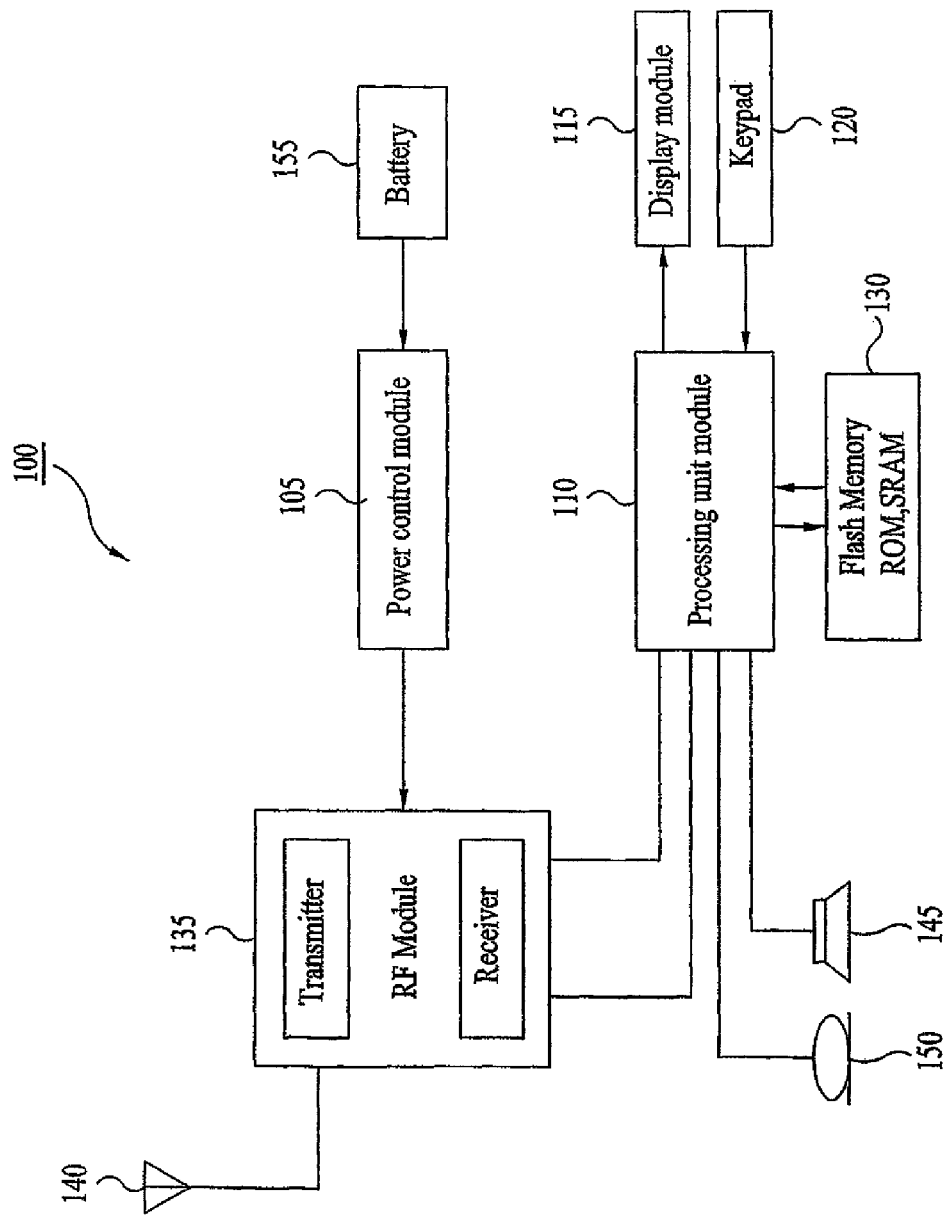
FIG. 11 is a block diagram of a wireless communication apparatus such as a mobile terminal that performs functions of the present invention.

FIG. 11 is a block diagram of a wireless communication apparatus 100 such as a mobile terminal that performs functions of the present invention.

Referring to FIG. 11, a wireless communication apparatus 100 includes a processing unit module 110 such as a microprocessor and a digital processor, an RF module 135, a power control module 105, an antenna 140, a battery 155, a display module 115, a keypad 120, a storage module 130 such as a ROM, an SRAM, and a flash memory, a speaker 145 and a microphone 150.

A user inputs command information such as a phone number by pressing a button or activates voice using the microphone 145. The processing unit module 110 receives and processes the command information to perform a function requested by the user. The processing unit module 110 searches the storage module 130 for data necessary for performing the function and then uses the data. And, the processing unit module 110 enables the user's command information and the data searched from the storage module 130 to be displayed on the display module 115 for user's convenience.

The processing unit module 110 delivers information to the RF module 135 to transmit a radio signal including voice communication data. The RF module 135 includes a transmitter and a receiver to transmit and receive the radio signal. The radio signal is finally transmitted or received via the antenna 140. Once receiving the radio signal, the RF module 135 converts the radio signal to a baseband frequency to enable the processing unit module 110 to process the radio signal. The converted signal is delivered via the speaker 145 or as readable information.

The RF module 135 is used in receiving data from a network or transmitting information measured or generated by the wireless communication apparatus to the network. The storage module 130 is used in storing the information measured or generated by the wireless communication apparatus. And, the processing unit module 110 is appropriately used for the wireless communication apparatus to receive data, process the received data and transmit the processed data.

Preferably, the processing unit module 110 is adapted to process control information to be transmitted and generate a data block. The transmitter of the RF module 135 is controlled by the processor unit module 110 for transmitting the data block on a first physical channel, wherein the data block comprises the control information. The transmitter is also adapted to transmit an indicator having a specific value on a second physical channel for indicating the transmission of the control information on the first physical channel.

Preferably, the processing unit module 110 is adapted to determine whether a specific event has occurred and generate a data block. The transmitter of the RF module 135 is controlled by the processing unit module 110 for transmitting an indicator for indicating a size of the data block transmitted on a physical channel if it is determined that the specific event has not occurred. The transmitter also transmits the indicator with a specific value for indicating the specific event if it is determined that the specific event has occurred.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention is applicable to a mobile communications system such as an LTE (Long Term Evolution) system, a 3GPP or 3GPP2 system, or a broadband wireless access system for mobile internet, etc.

What is claimed is:

1. A method of receiving a multimedia broadcast multicast service via a single frequency network transmission, the method comprising:
   receiving, by a user device, first signaling information and second signaling information from a network,
   wherein the first signaling information includes static information for receiving the multimedia broadcast multicast service from at least one cell among a plurality of cells,
   wherein the second signaling information includes dynamic information for the multimedia broadcast multicast service, and
   wherein the dynamic information includes identifier information for service data of the multimedia broadcast multicast service; and
   receiving, by the user device, the service data of the multimedia broadcast multicast service,
   wherein data units carrying the service data of the multimedia broadcast multicast service in frames are combined based on at least one of the first signaling information or the second signaling information.

2. The method of claim 1, wherein the static information further includes information on a frame number associated with the multimedia broadcast multicast service.

3. The method of claim 1, wherein the dynamic information further includes information about a specific region allocated for the multimedia broadcast multicast service.

\* \* \* \* \*